(12) United States Patent
Vigilant et al.

(10) Patent No.: US 8,477,933 B2
(45) Date of Patent: Jul. 2, 2013

(54) CRYPTOGRAPHIC ALGORITHM FAULT PROTECTIONS

(75) Inventors: David Vigilant, Meudon (FR); Stéphanie Salgado, Meudon (FR)

(73) Assignee: Gemalto SA, Meudon (FR)

( * ) Notice: Subject to any disclaimer, the term of this patent is extended or adjusted under 35 U.S.C. 154(b) by 112 days.

(21) Appl. No.: 13/123,655

(22) PCT Filed: Oct. 9, 2009

(86) PCT No.: PCT/EP2009/063205
§ 371 (c)(1),
(2), (4) Date: Apr. 19, 2011

(87) PCT Pub. No.: WO2010/046251
PCT Pub. Date: Apr. 29, 2010

(65) Prior Publication Data
US 2011/0274268 A1    Nov. 10, 2011

(30) Foreign Application Priority Data
Oct. 24, 2008   (EP) ..................................... 08305727

(51) Int. Cl.
*H04L 9/28* (2006.01)
(52) U.S. Cl.
USPC .......................................................... 380/28
(58) Field of Classification Search
USPC .......................................................... 380/28
See application file for complete search history.

(56) References Cited

U.S. PATENT DOCUMENTS

| 7,290,289 B2 * | 10/2007 | Janke et al. ..................... 726/34 |
| 7,836,309 B2 * | 11/2010 | Holt et al. ..................... 713/182 |
| 2004/0186979 A1 | 9/2004 | Janke et al. |
| 2007/0189536 A1 * | 8/2007 | Gammel et al. ............. 380/259 |

OTHER PUBLICATIONS

PCT/EP2009/063205, Internal Search Report, Dec. 1, 2009, European Patent Office, P.B. 5818 Patentlaan 2 NL-2280 HV Rijswijk.
PCT/EP2009/063205, Written Opinion of the Internaling Authority, Dec. 1, 2009, European Patent Office, P.B. 5818 Patentlaan 2 NL-2280 HV Rijswijk—Pays Bas.

* cited by examiner

*Primary Examiner* — Kambiz Zand
*Assistant Examiner* — Aubrey Wyszynski
(74) *Attorney, Agent, or Firm* — The Jansson Firm; Pehr B. Jansson

(57) ABSTRACT

The invention relates to a method for securing the execution of a cryptographic algorithm A against fault attacks. Given a cryptographic key KO and a message M, the cryptographic algorithm A is set to compute a value A(KO,M). Given a relationship R between A(KO,M) and A(f(K0),g(M)), where f and g are two bijections, and where f is different from the identity function, the method comprises: a. computing the expected result A(KO,M) of the cryptographic algorithm b. computing a modified result A(f(K0),g(M)), by applying the cryptographic algorithm A on a modified key f(K0) and on a message g(M), c. checking whether the relationship R between the values A(KO,M) and A(f(K0),g(M)) computed in the two preceding steps is verified d. detecting an attack if the relationship R is not verified. The invention also relates to a cryptographic device embodying the above method.

16 Claims, 1 Drawing Sheet

```
[...]
Generate a random permutation S on 2*(n+1) elements
Allocate a table T containing 2*(n+1) elements
R = 0
for k=0; k<=2*n+1; k++
    if S(k) <= n
        T[k] = DES(K_{S(k)}, M)
    else
        T[k] = DES(K_{S(k)-n-1}, M)
    R = R XOR T[k]
if n is even
    if R+1 is not equal to 0
        attack detected
else
    if R is not equal to 0
        attack detected
[...]
```

```
[...]
Generate a random permutation S on 2*(n+1) elements
Allocate a table T containing 2*(n+1) elements
R = 0
for k=0; k<=2*n+1; k++
    if S(k) <= n
        T[k] = DES(K_{S(k)},M)
    else
        T[k] = DES(K_{S(k)-n-1},M)
    R = R XOR T[k]
if n is even
    if R+1 is not equal to 0
        attack detected
else
    if R is not equal to 0
        attack detected
[...]
```

CRYPTOGRAPHIC ALGORITHM FAULT PROTECTIONS

BACKGROUND OF THE INVENTION

The invention relates to a method for protecting the execution of a cryptographic algorithm against fault attacks.

Cryptographic algorithms can typically be executed by any programmable computer. However, it turns out that even a securely designed cryptographic algorithm may become insecure when executed on an insecure computer. For example, spyware could be installed inside the computer and attempt to retrieve key material used by the cryptographic algorithm, thereby rendering cryptographic operations absolutely useless (for example the hacker would be able to obtain clear text information with the retrieved key material).

It has therefore been proposed, for sensitive applications, to implement cryptographic algorithms in special cryptographic devices (secure cryptographic devices), which are designed to be as secure as possible for the purpose of cryptographic operations.

Such cryptographic devices can take the form of a regular computer, secured by controlling the software which is installed on it, and by installing specific security software such as firewall, antivirus, antispyware, etc. Such computer can be a laptop computer, a desktop computer, a PDA (personal digital assistant), a cell phone, or any other kind of computer made more secure by controlling it tightly. The security can be assessed by passing security certifications such as Common Criteria, FIPS 140-2, etc.

It is often preferred to rely on a dedicated device, which is specialized in cryptography, and which is easier to secure. Typical examples of such dedicated cryptographic devices include smart cards, USB keys, dongles, TPMs (Trusted Platform Module), HSMs (HSM stands for Hardware Security Module, which is a well known security device typically equipped with a powerful CPU allowing it to carry a lot of cryptographic operations in order to support even very demanding servers), SSL/TLS accelerators, etc. Such dedicated cryptographic devices are typically used in conjunction with a regular computer (e.g. workstations, servers, PCs, cell phones, PDAs, etc.), to which they add a supplementary level of security, e.g. by making it much more difficult to steal key material.

However, even dedicated devices can be subject to attacks. For example invasive attacks (sometimes called physical attacks, or fault attacks) on such dedicated cryptographic device typically consist in disturbing the expected behavior of the device and making it work abnormally in order to infer sensitive data. Such attacks were introduced in the late nineties. They are a serious concern, because they could lead an attacker to recover key material even when stored in cryptographic devices such as smart cards, which are normally considered secure. This would allow the attacker to impersonate the legitimate user (e.g. perform financial transactions from his bank account, use his phone line, carry out illegal activities in his name, etc.). In the past such attacks were not perceived as critical for personal computers since there are typically plenty of easier ways to crack a computer with pure software means, without the burden of an invasive attack. However, due to growing fraud, and with the emergence of components such as TPMs (trusted platform modules, which specifications are managed by the Trusted Computing Group), this could change. TPMs are meant to introduce secure cryptographic features in possibly all sorts of products (PDAs, printers, cell phones, etc.), they are more and more common especially in corporate PCs, but also in all sorts of electronic equipments. TPMs can be an integral part of a motherboard on which they are welded (it is possible for a TPM to be removable, by having it inserted in a specific slot, although a TPM has little reasons to be removed regularly). TPMs typically comprise means for managing cryptographic material of a computing system more securely than if it was done solely by conventional means of the computing system, such as the computing system processor and memory. There have also been attempts to improve the security of generic processors (such as main processors embedded in conventional computer systems). So invasive attacks now become a threat to a lot more devices than before, and not only for standalone cryptographic devices or high security computers (e.g. sensitive servers). As the technological response of hardware manufacturers evolves, new hardware countermeasures are being added regularly. However it is widely believed that those can only be effective if combined with efficient software countermeasures. Embedded devices are especially exposed to this category of attacks when the attacker has the hardware fully available in hands. A typical example of invasive attack is the original Bellcore attack which allows an attacker to retrieve the RSA private key given one faulty signature.

Of particular concerns are special invasive attacks which consist in changing the value stored in a key register. A key register is a register storing a cryptographic key, e.g. a DES key, an AES key or an RSA key. Such attacks are more and more efficient, and it is now possible, under certain conditions, to target a specific bit of a register meant to contain a key (e.g. with laser or other means), and to change the value of this bit. It is also possible to repeat the same attack, which makes it inefficient for example to compare the result of two consecutive computations with the same key, since the value of the key could be altered twice in the same way and lead to the same (wrong) result, despite the redundancy of the operation.

However, depending on the type of memory composing the register, existing attacks typically always resets the bit to 0 or always sets the bit to 1. A "safe-error attack" is based on the assumption that the attacker has the above mentioned ability to force a precise bit of the key either to 1 or 0 (depending on the chip). Thus he can deduce if the bit was 0 or 1 by looking at the effects produced by his attack. Good result/normal reaction: the bit already had the forced value before being forced. Wrong result/abnormal behavior (e.g. attack detected): the bit had the opposite value of the forced value.

There is still no known technique able to easily set a chosen bit to any desired value (0 or 1), at will. Such techniques, called multi-spatial fault injections, are considered hardly feasible.

SUMMARY

It is therefore an object of the invention to modify the implementation of a cryptographic algorithm (without modifying the final result of course), in such a way that an attempt to modify a cryptographic key during the execution of the cryptographic algorithm be detected or at least reduce the ability of the attacker to draw a conclusion on the value of the bits composing the key. In particular, the method aims at protecting against state of the art attacks which are not able to change the value of the bits in both directions, but only either to reset the bits to 0 or to set the bits to 1.

BRIEF DESCRIPTION OF THE DRAWINGS

The invention and its advantages will be explained more in details in the following specification referring to the appended drawings, in which FIG. 1 represents a pseudo code implementing a method according to a preferred embodiment of the invention.

DETAILED DESCRIPTION

According to a preferred embodiment of the invention, a method is proposed for securing the execution of a cryptographic algorithm A against fault attacks. The cryptographic algorithm A can be for example DES (or DES$^{-1}$, i.e. DES decryption), 3DES (or 3DES$^{-1}$), or AES (or AES$^{-1}$), or asymmetric algorithms such as RSA, elliptic curves, Diffie Hellman, etc. (each asymmetric algorithm being used either for a public key operation, such as RSA encryption or RSA signature verification, or for a private key operation, such as RSA signature or RSA decryption). The cryptographic algorithm A involves a key K0 and a message M. The cryptographic algorithm A is set to compute a value A(K0,M). For example, in a preferred embodiment, A is the DES algorithm, M is a piece of data to be encrypted with the DES algorithm, K0 is a DES key to be used for the encryption, and A(K0,M) is the encrypted message. Given a relationship R between A(K0,M) and A(f(K0),g(M)), where f and g are two bijections, and where f is different from the identity function, the method comprises:

a. computing the expected result A(K0,M) of the cryptographic algorithm
b. computing a modified result A(f(K0),g(M)), by applying the cryptographic algorithm A on a modified key f(K0) and on a message g(M),
c. checking whether the relationship R between the values A(K0,M) and A(f(K0),g(M)) computed in the two preceding steps is verified
d. detecting an attack if the relationship R is not verified The order in which steps a and b are carried out does not matter, and is preferably random. Of course, the bijections f and g and the relationship R are all linked together and to the cryptographic algorithm A, and cannot be chosen arbitrarily, they have to be defined by those skilled in the art (for certain algorithms A there is no convenient relationship R, in which case the proposed method is not applicable).

For an RSA private key operation, K0 can be denoted d (RSA private key exponent), and A(K0,M)=A(d,M)=M$^d$ mod N (standard RSA, well known in the art). Let e be the public exponent, and N be the modulus of the RSA key pair (conventional notations for RSA). It is possible, for example, to define f(d) as f(d)=d+b*(e*d−1), and to define g(M) as g(M)= M*(a$^e$) mod N, where a and b are two random numbers comprised between 1 and N−1 (0<a,b<N). Preferably, the number a should not be a multiple of p or q, where p and q are the primes composing the modulus N (otherwise g is not bijective, and the verification of the relationship R is less easy, as it is possible to compute A(f(d),g(M)) from A(d,M) but not necessarily the other way).

With this definition of f and g, we have A(f(d),g(M))=a*A (d,M) mod N, which is the relationship R to verify.
Indeed:

$$A(f(d), g(M)) = [M*(a^e)]^{[d+b*(e*d-1)]} \bmod N$$
$$= [M^d*(a^e)^d]*[M*(a^e)]^{[b*(e*d-1)]} \bmod N$$
$$= M^d*(a^e)^d \bmod N$$
$$= a*(M^d) \bmod N$$
$$= a*A(d, M) \bmod N$$

It is preferred for the function f to modify as many bits as possible in the key K0, since a same attack carried on both K0 and f(K0), will typically not be able to modify both K0 and f(K0) if it targets one of the bits that are different in K0 and in f(K0) (i.e. it will change the target bit either in K0 or in f(K0), but not in both K0 and f(K0)). Indeed, state of the art attacks are able to set bits to 1 or reset them to 0, but not to define their value as 0 or 1 at will. Even if the attack was able to change the bits at will, the attacker should change K0 and f(K0) in a manner such that the relationship R between the values A(K0, M) and A(f(K0),g(M)) still be met, which can be a difficult problem depending on how R is defined.

In a preferred version of the above method, the bijection f consists in inverting all bits of the key K0, i.e. every 0 in K0 is replaced by a 1 in f(K0) and vice versa. This is advantageous since the attacker cannot change a given bit both in K0 and in f(K0), based on above discussed state of the art attacks.

The bijection g may consist in inverting all bits of the message M. Sometimes it may not be needed to change the message, but sometimes the properties of the cryptographic algorithm A are such that it is advantageous to modify the message too (with g being different from the identity) in order to simplify the relationship R.

In particular, the relationship R may consist in the fact that the each bit of the expected result A(K0,M) is the inverse of the corresponding bit of the modified result A(f(K0),g(M)).

For example, with the DES algorithm, a preferred method would consist in:

a. computing the expected result r=DES(K0,M)
b. computing a modified result mr=DES($\overline{K0}$,$\overline{M}$), where $\overline{K0}$ denotes the logical bit complement of K0, and $\overline{M}$ denotes the logical bit complement of M.
c. checking whether the first result r is the logical bit complement of the second result mr. For example, it is possible to check that r XOR mr is equal to 11111 . . . 11.
d. detecting an attack if the relationship is not verified, i.e. if the two results are not logical bit complements.

The order of steps a and b does not matter and is preferably random. The same example works equally by replacing DES by DES$^{-1}$, by 3DES or by 3DES$^{-1}$.

According to an improved version of the above methods, it is possible to generate n random keys K1 . . . Kn, and to compute in random order A(Ki,M) and A(f(Ki),g(M)) for every i between 0 and n. The order is preferably different each time the method is invoked. For example, for n=3, the order could be A(f(K2),g(M)), A(f(K0),g(M)), A(K1,M), A(f(K3), g(M)), A(K0,M), A(K0,M), A(K2,M), A(f(K1),g(M)), and next time the method is invoked, the order could be different.

Then the preferred method checks the relationship R for each couple of values A(Ki,M) and A(f(Ki),g(M)), and detects an attack if the relationship R is not verified for any i between 0 and n. This technique is advantageous because it is very hard for a hacker to know at what point the method computes which cryptographic operation, e.g. the hacker does not know when the method computes the really useful cryptographic operation (the one computing the expected result A(K0,M)), therefore when doing the attack the hacker does not know which key he is disturbing. This makes it even harder for the hacker to draw conclusions. With a naïve computation A(K0,M), the hacker could try to set one bit of K0, and if the bit was already set, the method would output the expected result, and if the bit of the key was not set, the method would output an error message (if attack detected) or an erroneous result, therefore informing the hacker whether the bit of the key was 0 or 1. But with this preferred embodiment, whenever the hacker attempts to modify something, he has a very high likelihood to draw wrong conclusions because the bit he possibly guessed was not necessarily the bit of the key K0, but could be the bit of any key Ki, or f(Ki) (one chance out of 2*(n+1) to target the right key).

It should be noted that even with n=0 it is possible to compute in random order either A(K0,M) and then A(f(K0), g(M)) or first A(f(K0),g(M)) and then A(K0,M).

In an improved version of the method that has just been described, the verification can be simplified, for example if f and g consist in taking the logical bit complement of the input parameter, and if the relationship consists in verifying that the two results are logical bit complements, the verification can consist in XORing all results, and verifying, if n is odd, that the final result is 0, and if n is even, that the result is 1111 . . . 111

For example, in the case of DES, the pseudo code according to FIG. 1 could be used.

Notes: in this pseudo code, and in the line T[k]=DES($\overline{K_{S(k)-n-1}}$,M), the underscore designate the logical bit complement operation. Checking that R is equal to 11111 . . . 11 can be checked by verifying that R+1 is equal to 0.

Of course, the same pseudo code would be applicable to $DES^{-1}$, to 3DES or to $3DES^{-1}$.

The invention also relates to a cryptographic device implementing a method as described above. The cryptographic device can be any device implementing a cryptographic algorithm, either in software or in hardware. However, in preferred embodiments, the cryptographic device is a secure cryptographic device, such as a smart card, a TPM, or an HSM, all three of which typically comprise security features (hardware and/or software based) making them a lot more secure than for example a general purpose computer.

The invention claimed is:

1. A method for operating a cryptographic device to secure a cryptographic algorithm A executing on the cryptographic device against fault attacks, wherein, given a cryptographic key KO and a message M, the cryptographic algorithm A is set to compute a value A(KO,M), and wherein, given a relationship R between A(KO,M) and A(f(K0),g(M)), where f and g are two bijections, and where f is different from the identity function, the method comprises:
   a. computing the expected result A(KO,M) of the cryptographic algorithm;
   b. computing a modified result A(f(K0),g(M)), by applying the cryptographic algorithm A on a modified key f(KO) and on a message g(M)
   c. checking whether the relationship R between the values A(KO,M) and A(f(K0),g(M)) computed in the two preceding steps is verified;
   d. detecting an attack if the relationship R is not verified.

2. The method according to claim 1, wherein the bijection f consists in inverting all bits of the key KO.

3. The method according to claim 1 or 2, wherein the bijection g consists in inverting all bits of the message M.

4. The method according to claim 1 or 2, wherein the relationship R consists in the fact that the each bit of the expected result A(KO,M) is the inverse of the corresponding bit of the modified result A(f(K0),g(M)).

5. The method according to claim 1 or 2, comprising generating n random keys K1 . . . Kn, computing in random order A(Ki,M) and A(f(Ki),g(M)) for every i between 0 and n, checking the relationship R for each couple of values A(Ki, M) and A(f(Ki),g(M)), and detecting an attack if the relationship R is not verified for any i between 0 and n.

6. The cryptographic device implementing a cryptographic algorithm A, wherein, given a cryptographic key KO and a message M, the cryptographic algorithm A is set to compute a value A(KO,M), given a relationship R between A(KO,M) and A(f(K0),g(M)), where f and g are two bijections, and where f is different from the identity function, the cryptographic device comprises means for:
   a. computing the expected result A(KO,M) of the cryptographic algorithm;
   b. computing a modified result A(f(K0),g(M)), by applying the cryptographic algorithm A on a modified key f(KO) and on a message g(M);
   c. checking whether the relationship R between the values A(KO,M) and A(f(K0),g(M)) computed in the two preceding steps is verified;
   d. detecting an attack if the relationship R is not verified.

7. The cryptographic device according to claim 6, wherein the bijection f consists in inverting all bits of the key KO.

8. The cryptographic device according to claim 6 or 7, wherein the bijection g consists in inverting all bits of the message M.

9. The cryptographic device according to claim 6 or 7, wherein the relationship R consists in the fact that the each bit of the expected result A(KO,M) is the inverse of the corresponding bit of the modified result A(f(K0),g(M)).

10. The cryptographic device according to claim 6 or 7, comprising means for:
   a. generating n random keys K1 . . . Kn,
   b. computing in random order A(Ki,M) and A(f(Ki),g(M)) for every i between 0 and n,
   c. checking the relationship R for each couple of values A(Ki,M) and A(f(Ki),g(M)), and for
   d. detecting an attack if the relationship R is not verified for any between 0 and n.

11. The cryptographic device according to claim 6 or 7, wherein the cryptographic device is a smart card, a TPM, or an HSM.

12. The method according to claim 3, wherein the relationship R consists in the fact that the each bit of the expected result A(KO,M) is the inverse of the corresponding bit of the modified result A(f(K0),g(M)).

13. The method according to claim 3, comprising generating n random keys K1 . . . Kn, computing in random order A(Ki M) and A(f(Ki),g(M)) for every i between 0 and n, checking the relationship R for each couple of values A(Ki, M) and A(f(Ki),g(M)), and detecting an attack if the relationship R is not verified for any i between 0 and n.

14. The cryptographic device according to claim 8, wherein the relationship R consists in the fact that the each bit of the expected result A(KO,M) is the inverse of the corresponding bit of the modified result A(f(K0),g(M)).

15. The cryptographic device according claim 8, comprising means for:
   a. generating n random keys K1 . . . Kn,
   b. computing in random order A(Ki,M) and A(f(Ki),g(M)) for every i between 0 and n,
   c. checking the relationship R for each couple of values A(Ki,M) and A(f(Ki),g(M)), and for
   d. detecting an attack if the relationship R is not verified for any between 0 and n.

16. The cryptographic device according to claim 8, wherein the cryptographic device is a smart card, a TPM, or an HSM.

* * * * *